(74.)
JOHN B. THOMISON.
Improvement in Harvesters.
No. 122,201.            Patented Dec. 26, 1871.
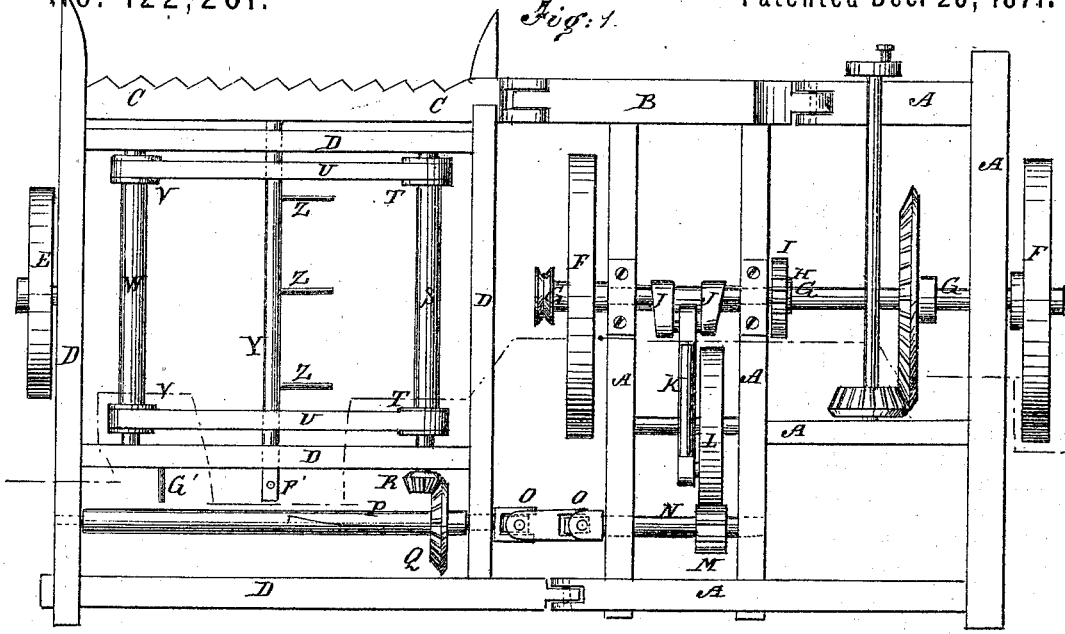
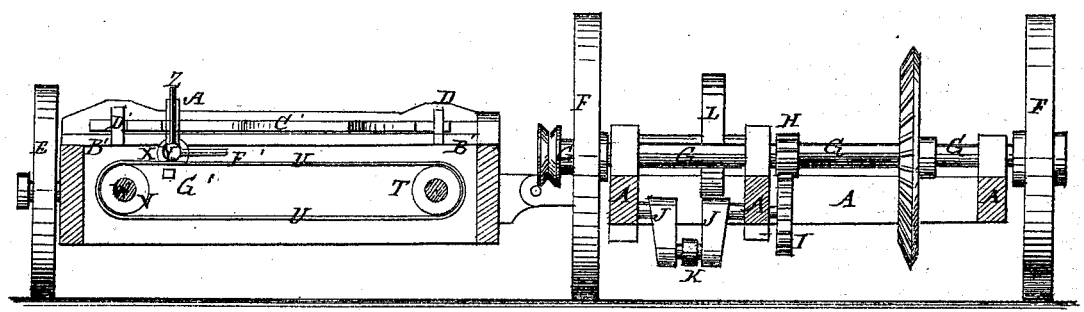
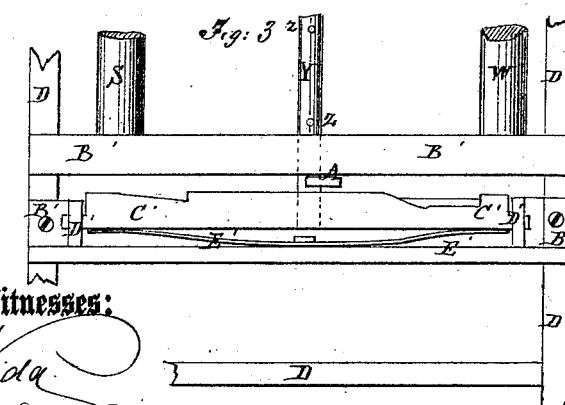
Witnesses:
Chas. Nida
Francis McArdle
Inventor:
J. B. Thomison
Per
Attorneys.

122,201

UNITED STATES PATENT OFFICE.

JOHN B. THOMISON, OF LYNCHBURG, TENNESSEE.

IMPROVEMENT IN HARVESTERS.

Specification forming part of Letters Patent No. 122,201, dated December 26, 1871.

Specification describing a certain Improvement in Reapers and Mowers, invented by JOHN B. THOMISON, of Lynchburg, in the county of Lincoln and State of Tennessee.

Figure 1 is a bottom view of my improved machine arranged as a reaper. Fig. 2 is a detail vertical section of the same taken through the irregular line $x\ x$, Fig. 1. Fig. 3 is a detail view of the device for turning the rake down for its backward movement.

Similar letters of reference indicate corresponding parts.

My invention has for its object to furnish an improved reaper and mower, which shall be simple in construction and effective in operation in either capacity, and which shall be so constructed as to rake the grain automatically from the platform and drop it upon the ground in such a position as to be out of the way of the machine in its next passage; and it consists in the construction and combination of various parts of the machine, as hereinafter more fully described.

A is the frame of the machine, to which the driving mechanism is attached, to the under side of the middle part of the front bar of which is hinged or jointed one end of the bar B, to the other or outer end of which is hinged or jointed the inner end of the finger-bar C. D is the frame, to which the raking device is attached, and the forward part of which is attached to the finger-bar C. The inner end of the rear bar of the frame D is pivoted to the end of the rear bar of the frame A. This construction allows the finger-bar to be raised and lowered to adapt the machine for use as a reaper or mower, or to adapt it to cut the grain higher or lower by simply adjusting the bar B. E is the grain-wheel, which is pivoted to the frame D. F are the drive-wheels, which are attached to the shaft G, which revolves in bearings attached to the frame A. To the shaft G is attached a small gear-wheel, H, the teeth of which mesh into the teeth of a larger gear-wheel, I, attached to the shaft J, which revolves in bearings attached to the frame A. One of the bearings of the shaft J should be made movable, and should be provided with a foot-lever to enable the raking device to be thrown out of gear with the driving mechanism when desired. Upon the shaft J is formed a crank, to which is pivoted one end of the connecting-rod K, the other end of which is pivoted to a crank-pin attached to the wheel L, at a distance from its center greater than the length of the crank J, so that the revolution of the crank J may give a reciprocating movement to the wheel L. The journals of the wheel L revolve in bearings attached to the frame A. The wheel L has teeth formed upon it for about one-third, more or less, of its circumference, which teeth mesh into the teeth of the small gear-wheel M attached to the shaft N. The shaft N revolves in bearings attached to the frame A, and its outer end is connected by two universal joints, O, with the shaft P. The shaft P revolves in bearings attached to the frame D, and to it is attached a bevel-gear-wheel, Q, the teeth of which mesh into the teeth of a smaller bevel-gear wheel, R, attached to the end of the shaft S, which revolves in bearings attached to the front and rear bars of the frame D near its inner side. To the shaft S are attached pulleys or chain-wheels T, around which pass endless bands or chains U, which also pass around pulleys or chain-wheels V attached to the shaft W, which revolves in bearings in the front and rear bars of the frame D near its outer side. To the bands or chains U are attached lugs or eyes X, in which work the rods Y, to which the rake-teeth Z are attached. The teeth Z pass up through slots in the platform upon which the cut grain falls. To the rear part of the shaft Y is attached an arm, A', which is parallel or nearly parallel with the teeth Z. The arm A' passes up through a slot in the rear part B' of the platform. C' is a bar, the ends of which enter guide-keepers D' at or near the outer and inner sides of the said part B' of the platform and allow the bar C' to have a lateral but no longitudinal movement. The bar C' is held forward against the arm A' by a spring or springs, E', attached to the said part B' of the platform, and pressing against the rear side of the said bar C' near its ends. The forward edge of the outer part of the bar C' is cut away, as shown in Fig. 3, to allow the arm A' to rise at the outer side of the platform without being interfered with by the said bar C'. As the rake moves inward across the platform the bar C' presses against the arm A' and assists the grain in holding the rake-teeth erect. As the gavel is swept from the platform the arm A' enters a notch in the forward edge of the bar C', which notch, as the rake begins its outward movement, acts as a stop to the arm A' and forces it and with it the rake-teeth, into a horizontal position, while the rake is moving outward across the platform, the spring or springs E' holding the bar C' forward and over the slot in the part B' of the platform. To the rear part of the shaft Y is attached an arm or pin, F', which projects nearly at right angles with the arm A'. As the rake in its outer movement approaches the outer side of the platform the arm F strikes against a stop-pin, G', attached to the frame D, which turns the shaft Y and raises the arm A' and the rake-teeth Z into an erect position, the arm A' passing up through the recess in the outer part of the forward edge of the bar C'. By detaching the frame D, raking device, and reaper cutter-bar, and attaching a mower cutter-bar, the machine is converted into a mower.

Having thus described my invention, I claim as new and desire to secure by Letters Patent—

1. The shafts S W, pulleys or chain-wheels T V, endless bands or chains U, lugs or eyes X, shaft Y, rake-teeth Z, arm A', recessed and notched bar C', spring or springs E', arm or pin F', and stop-pin G', in combination with each other and with the finger-bar C, frame D, and the driving gearing of the machine, substantially as herein shown and described, and for the purpose set forth.

2. The arrangement of the gear-wheels H I, crank-shaft J, connecting-rod K, segmental reciprocating gear-wheel L, gear-wheel M, shaft N, universal joints O, shaft P, and gear-wheels Q R with each other and with the driving-shaft G, frame A, detachable-hinged frame D, and shaft S that operates the raking device, substantially as herein shown and described, for the purpose of giving a reciprocating movement to the rake, as set forth.

J. B. THOMISON.

Witnesses:
  S. M. ALEXANDER,
  WATTEN HILEES. (74)